United States Patent [19]

Sturm et al.

[11] Patent Number: 4,974,101
[45] Date of Patent: Nov. 27, 1990

[54] METHOD OF MONITORING THE LOADING AND UNLOADING OF A TAPE IN RECORDING AND PLAYBACK EQUIPMENT

[75] Inventors: Rainer Sturm, Gross-Gerau; Harald Tauchnitz, Mainz-Kostheim, both of Fed. Rep. of Germany

[73] Assignee: BTS Broadcast Television Systems GmbH, Darmstadt, Fed. Rep. of Germany

[21] Appl. No.: 318,649

[22] Filed: Mar. 3, 1989

[30] Foreign Application Priority Data

Mar. 4, 1988 [DE] Fed. Rep. of Germany ....... 3807051

[51] Int. Cl.⁵ .................. G11B 5/008; G11B 15/00
[52] U.S. Cl. ................................ 360/90; 360/85; 360/95
[58] Field of Search .............. 360/90, 93, 94, 95, 360/85, 137; 242/197–201

[56] References Cited

U.S. PATENT DOCUMENTS 4,727,442  2/1988  Clark .................................. 360/71

FOREIGN PATENT DOCUMENTS 3719159 12/1988  Fed. Rep. of Germany .

*Primary Examiner*—A. J. Heinz
*Attorney, Agent, or Firm*—Frishauf, Holtz, Goodman & Woodward

[57] ABSTRACT

A graphics display in the form of special effects recording, displayed on a monitor in real time in synchronism with the sensing and internal control signals utilized for the operation of the threading and unthreading as well as cassette loading and unloading in a videotape equipment, displays the course of the tape in all stages in simple graphics which can illustrate any malfunction. In the case of a failure the last normal position of the tape is stored.

8 Claims, 7 Drawing Sheets

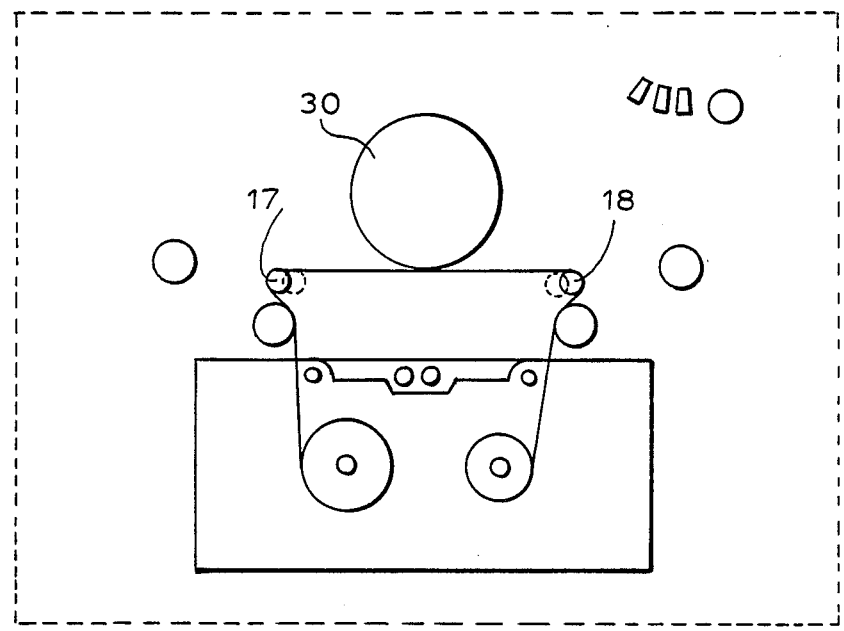
F I G. 4
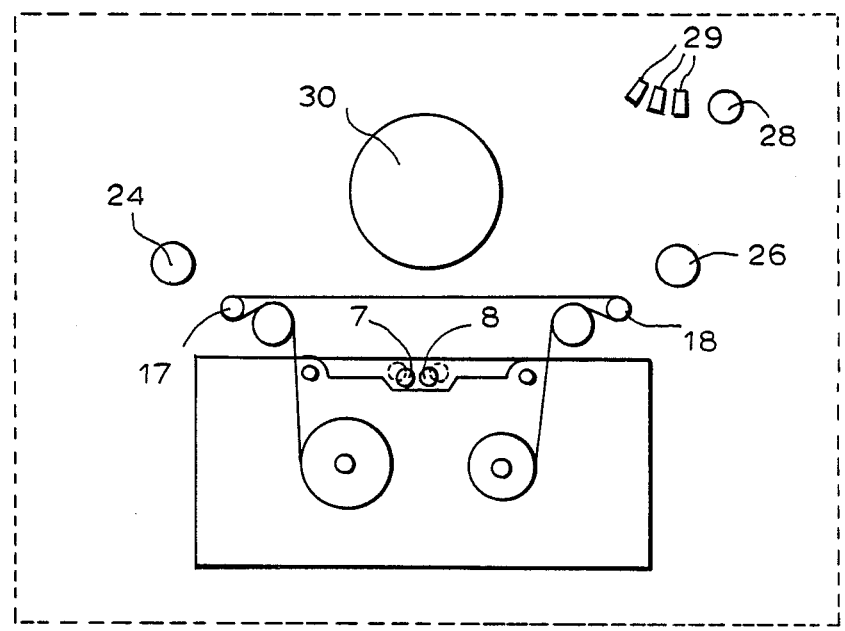
F I G. 5

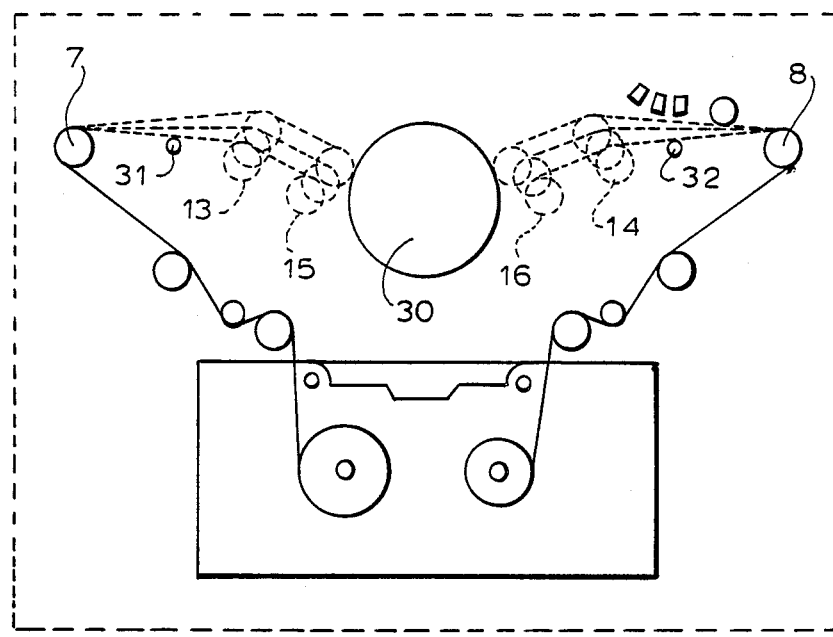
F I G. 10
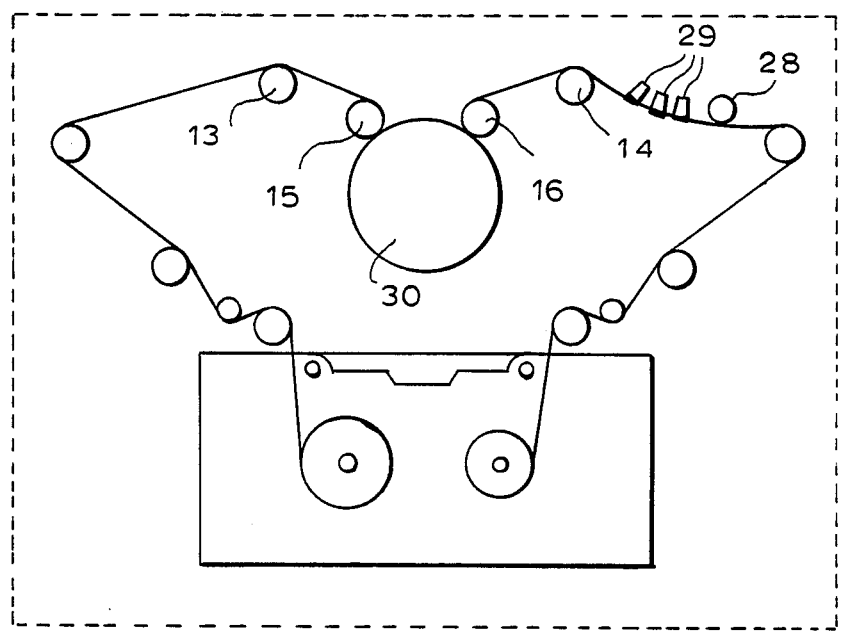
F I G. 11

METHOD OF MONITORING THE LOADING AND UNLOADING OF A TAPE IN RECORDING AND PLAYBACK EQUIPMENT

BACKGROUND OF THE INVENTION

The invention concerns monitoring the guiding of a magnetic tape of a cassette into a working position in recording and playback equipment and similarly the disengagement and unloading thereof from the equipment.

In videotape equipment of the oblique recording track type the magnetic tape is looped helically about a rotating scanning device. In order to simplify the handling of the tape, the tape is stored and held in a cassette wound up on two cores or spools. For pulling out the tape provided in a cassette and to loop the tape around the revolving scanning device (threading procedure) there is disclosed in German Patent Application No. 37 19 159 a mechanism which provides several stationary and movable rollers which pull the tape out of the cassette and dispose it in a certain path around the scanning device. An unthreading procedure operates in a manner opposite to the threading.

The threading and unthreading mechanism of such magnetic tape equipment is commonly located in a closed casing. The user of the equipment or maintenance personnel cannot recognize during threading or unthreading how far the cassette has already been pulled into the tape recording and playback equipment or into what position the tape is pulled out of the cassette.

SUMMARY OF THE INVENTION

It is an object of the present invention to provide a method of monitoring the guiding of the tape into a tape recording and playback equipment so that the state of the tape and its support components can be shown at every stage of loading and unloading.

Briefly, in the course of these operations the tape and/or its movable guides are sensed to produce signals and in response to the signals the course of the tape is optically displayed. This has the advantage that the state of the tape transport mechanism can be determined in the event of a disturbance or malfunction. This is made possible by a real-time-synchronized representation of mechanical movements inside the machinery of the tape recording and playback equipment on a display device capable of displaying graphics. The graphics displayed are separately recorded special effect (simulation) displays depicting the stages of the operation. The user, or maintenance personnel, can make a detailed diagnosis of a failure in the case of malfunction by a glance at the display.

BRIEF DESCRIPTION OF THE DRAWINGS

Further details and advantages of the invention are provided below by way of illustrative example with reference to the annexed drawings, in which:

FIGS. 2-12 are reproductions of actual plots displayed on a display device conforming with FIG. 1 illustrating displays of eleven stages of the loading of a cassette into a magnetic tape equipment and the immediately following tape threading procedure, several substages being shown in FIGS. 3-10 by several positions of some guide elements.

DESCRIPTION OF AN ILLUSTRATED EMBODIMENT

Figure 1:
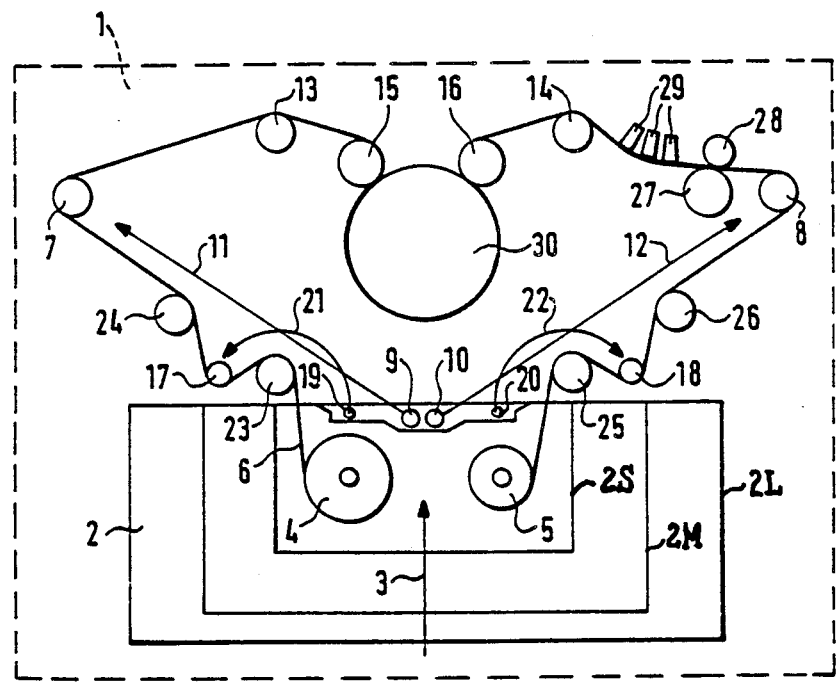
FIG. 1 is a schematic representation of a display device for showing the course of a tape in a digital videotape equipment, drawn for the threaded-in condition of the tape.

The screen or field of a display device 1 is shown in broken lines in FIG. 1. The solid lines of the drawing show a graphic representation of the course of a tape in a digital video magnetic tape equipment in the threaded-in condition. The display device 1 is capable of showing graphics and in this example consists of a large-surface luminescent indicator with any suitable type of computer controlled display raster. The display device, which may be referred to as a monitor, can serve at the same time for displaying stages of maintenance, control and editing functions at a maintenance station or desk (not shown) of the videotape equipment in question. Such graphicscapable display devices are in themselves known and as such are not part of the present invention. They are, in effect, relatively small computers more or less dedicated to a particular class of tape equipment and their functions could be performed by many computers serving more general purposes and likewise having graphics capability.

A videotape equipment of the present invention, which appears only in the graphics shown on the illustrated monitor display, is designed and equipped for receiving three different sizes of cassettes 2. It is assumed in the present example a smaller cassette size has been inserted in the cassette shaft or cavity (not shown) of the videotape equipment. In the illustrated case the course of motion of the cassette insertion shown on the monitor 1 in the form of a so-called "trick film", i.e. a computer-readable special effects (simulation) recording. The representation of the insertion procedure runs in real time. By announcement signals at significant points or stages of a threading control electronic system in the videotape equipment, synchronization of the recorded display to the operation of the equipment is accomplished. The threading control electronics (not shown) already in the equipment provide the signals at the significant points or stages of the progress of the mechanical operation for synchronizing the graphics display. These signals are readily obtainable and do not need to be further described here, except to mention that they are commonly provided partly by light beam sensing and partly by chemical sensing.

After the insertion of the cassette 2 in the direction 3, and its downward movement into the cassette shaft or cavity, a portion of the tape 6 located between the portion wound on the supply spool 4 and a portion (at least an end) wound on the take-up spool 5 is pulled out of the cassette 2. For that purpose two rollers 17 and 18 move the tape 6 from the positions 19 and 20 in directions 21 and 22 and lay it around the rollers 23 and 24 in the case of the roller 17 and around the rollers 25 and 26 in the case of the roller 18. Then rollers 7 and 8 grasp behind the tape 6 at 9 and 10 and respectively move it in the direction 11 and 12. The tape is then looped around the revolving scanning device 15 over rollers 13 and 14 which are both movable in their locations. The tape 6 is fixed in the height of its loop (the axial dimension) by other rollers 15 and 16 which are also movable in their respective positions. Finally, by a shift of the rubber pressure roller 27 the tape is pressed against a capstan shaft 28. A magnetic head unit 29 is located between the roller 14 and the capstan shaft for longitudinal recording of sound signals. As in the case of events following cassette insertion, the contemporary position of the magnetic tape and the positions of the rollers that are movable in position are displayed also in the threading procedure of the tape around the revolving scanning device 15 and this is done, likewise, in synchronism with the control operation which takes place during the threading after the word is displayed on the monitor 1.

FIG. 1 shows three different outlines for the cassette 2, namely the outline 2S for a small size cassette, 2M for a medium size cassette and 2L for a large size cassette. The top lines of these rectangular outlines coincide but extend laterally for different lengths. For clarity of showing different stages of the display of the progress of a cassette, FIGS. 2-12 illustrate only the progress of a medium size cassette, but it will be understood with reference to FIG. 1 how these various stages could be represented for the small and large cassette sizes.

FIGS. 2-11 are reproductions of actual displays of the complete tape-loading operation in accordance with the invention as they appear on the monitor of, a 4:2:2 VTR equipment conforming with the D1 international standard of SMPTE/EBU. The same monitor is used for other purposes after the tape is threaded and before it is unthreaded, as for example auto-edit procedures, audio cue and audio mixing, digital audio set-up, and testing and diagnostics, among others, with quite different kinds of displays. Several such units can be used together with a "Cheapernet" interconnection in the manner described in a copending U.S. application, filed Feb. 27, 1989, with a single monitor and control panel. The illustrated graphics shown in FIGS. 2-11 are of course protected by copyright for their content of original stylized illustration.

Figure 2:
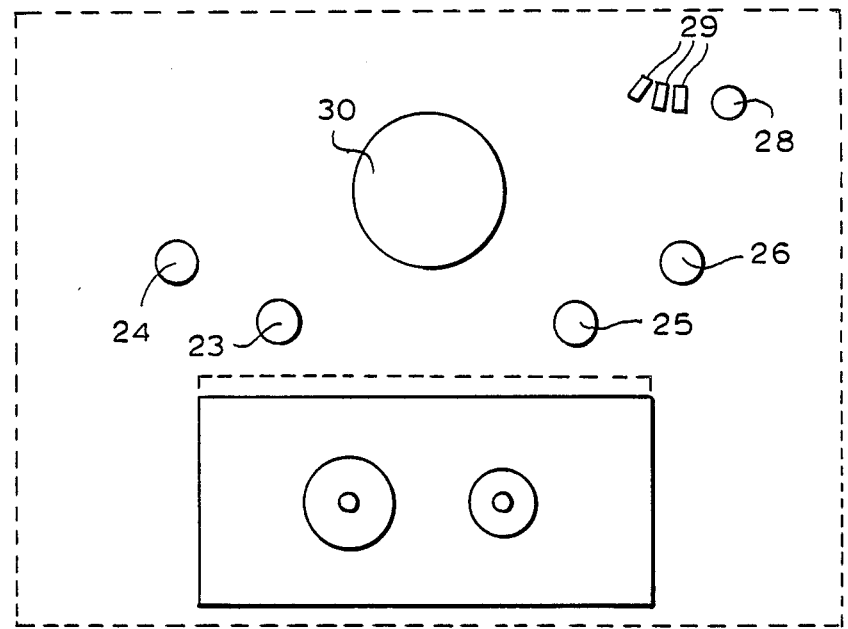
Figure 3:
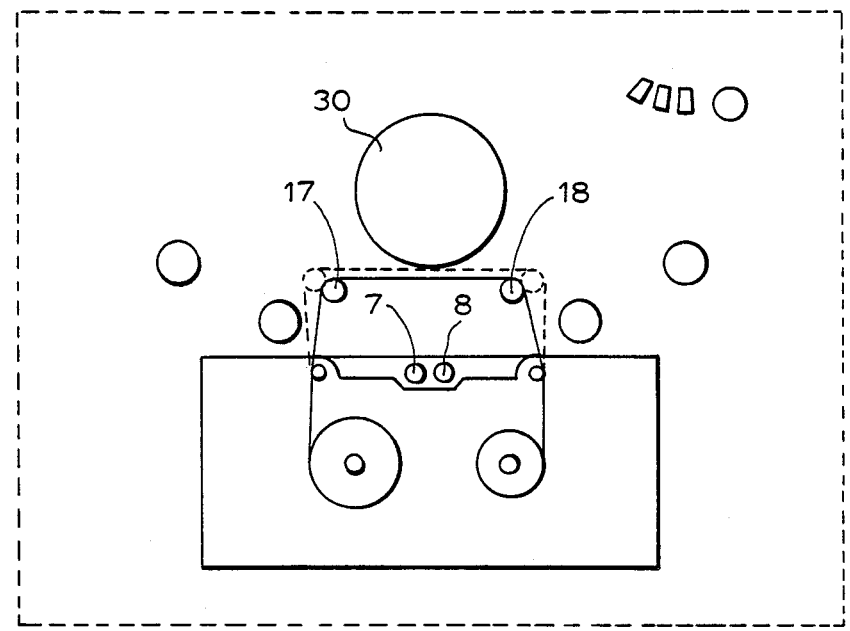

FIG. 2 shows a stage of the insertion of the cassette before the threading procedure starts. At this stage, for reasons of simplicity, representation of the cassette is simpler than is used for the threading procedure in the displays shown in FIGS. 3-12. FIG. 3 shows the cassette in its position after it has been lowered in a direction perpendicular to the plane of view in the display and away from the observer, in which the rollers 17 and 18 can engage the tape. FIG. 3 shows these rollers in a position in which the tape has been brought temporarily close to, but not in contact with, the headwheel 30.

FIG. 4 shows the movement of rollers 17 and 18 away from each other after the tape has been brought into a position in which it is approximately tangential to the headwheel 30. One position of these rollers is shown in broken lines and a subsequent position in solid lines, but of course these positions are shown sequentially on the monitor and not both at the same time.

FIG. 5 shows the beginning of the movement of the rollers 7 and 8, from their original positions (9 and 10 in FIG. 1) while the rollers 17 and 18 have reached a position in which the tape is pulled away from the headwheel 30 as the rollers 17 and 18 separate while proceeding on the paths 21 and 22 shown in FIG. 1. When the rollers 17 and 18 reach the position shown in FIG. 5 the second layer of the tape is close to the surfaces of the rollers 23 and 25 and is now time for the rollers 7 and 8 to perform their function and move out on the paths 11 and 12 shown in FIG. 1.

Figure 6:
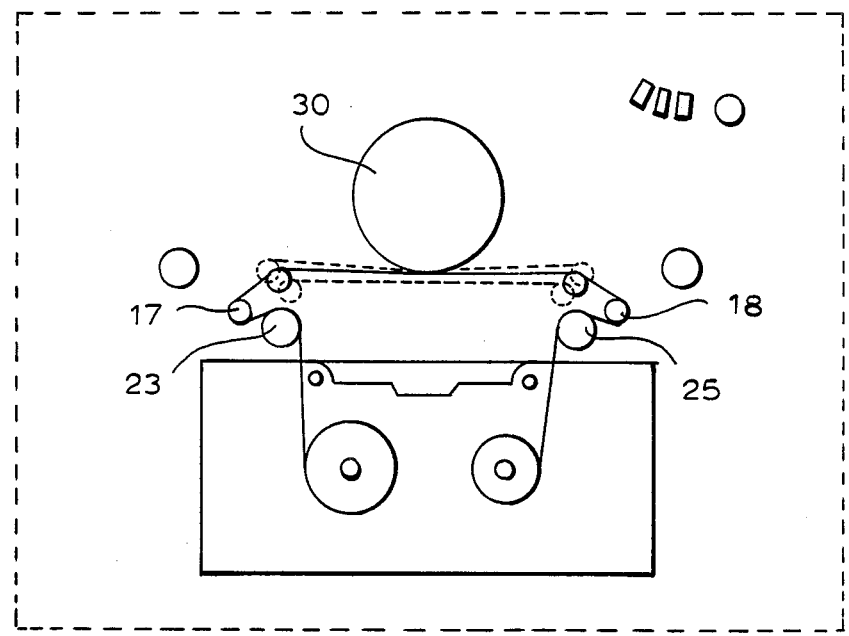
Figure 7:
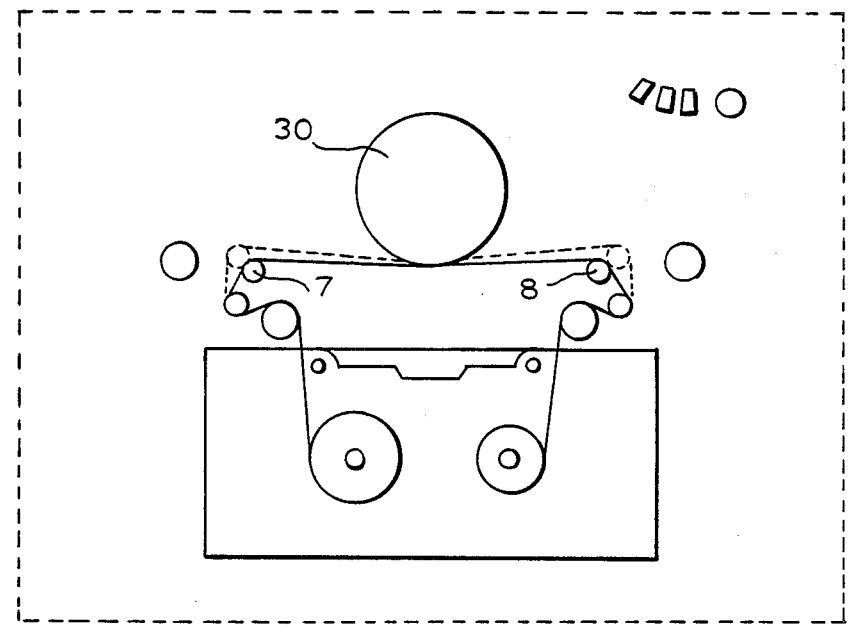

FIG. 6 shows the rollers 7 and 8 moved out far enough from their positions in FIG. 5 to bring the tape close to, but not in contact with the headwheel 30 and shows that at this time the rollers 17 and 18 have reached their final position FIG. 7 shows further movement of the rollers 7 and 8, with one position in which the tape is beginning to contact with the headwheel and a later position in which the rollers have brought the tape to begin to envelop the headwheel and its unshown stationary drum which supports the portion of the tape out of contact with the headwheel.

Figure 8:
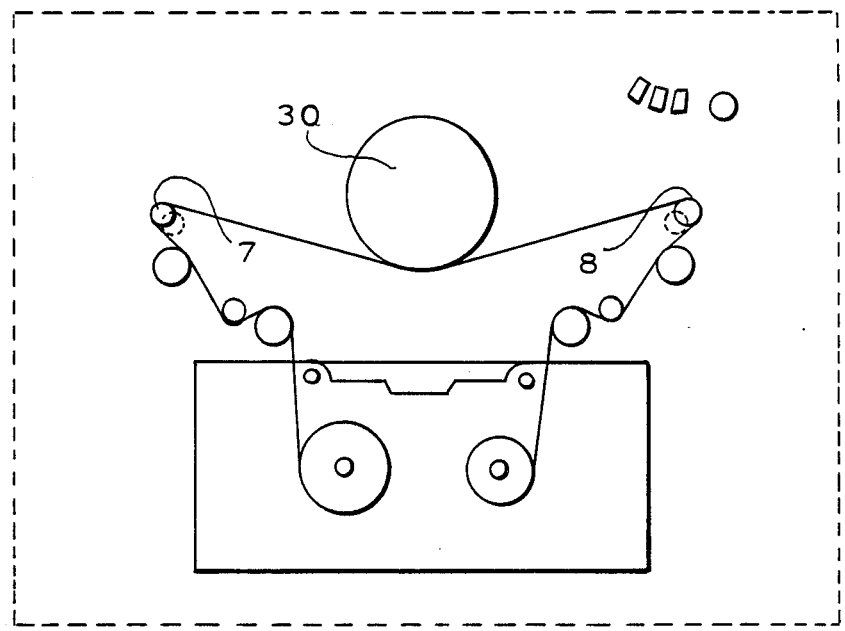
Figure 9:
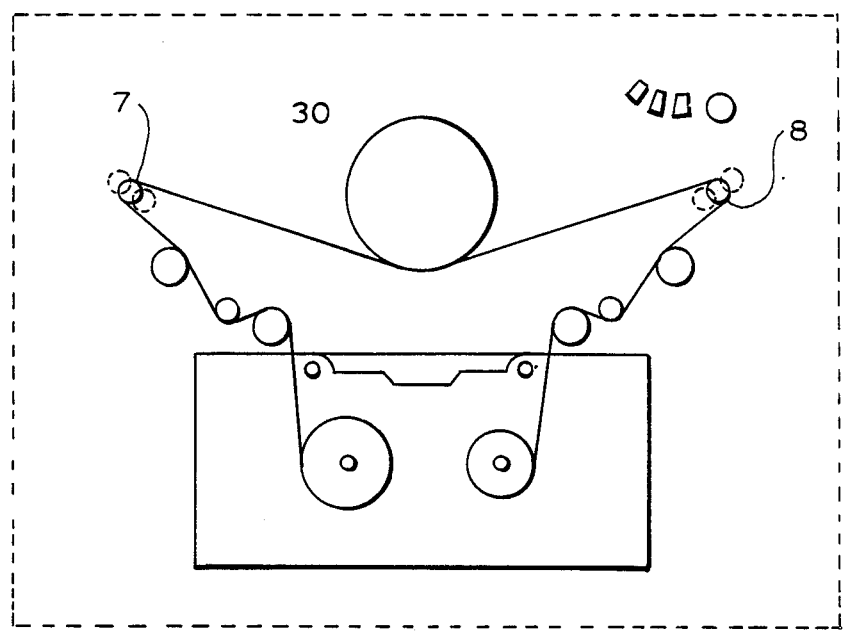
Figure 12:
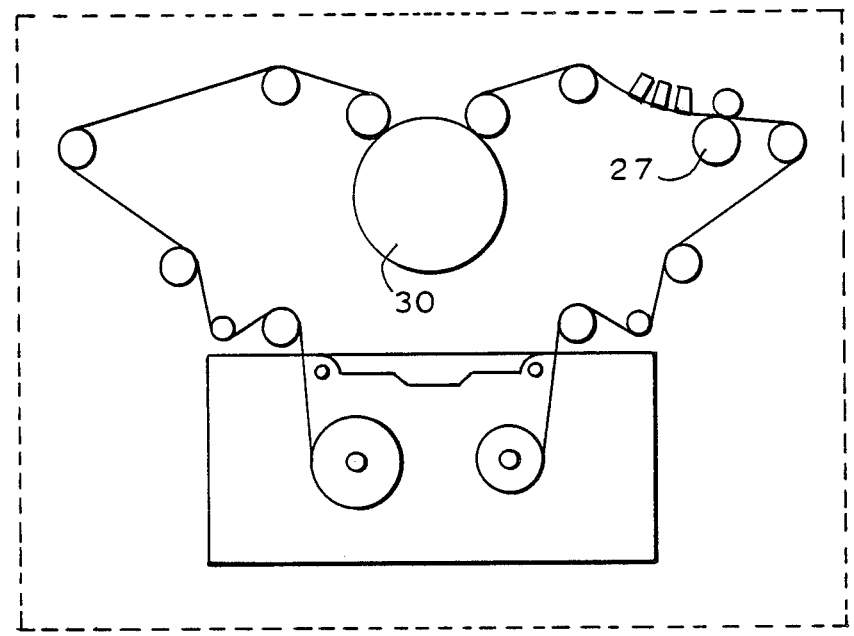

FIGS. 8 and 9 show the rollers 7 and 8 moving further towards their operating positions and FIG. 10 shows these rollers in their operating positions.while the rollers 13, 14, 15 and 16, which were not shown in FIGS. 2-9 to simplify the display in the earlier stages, are shown in FIG. 10 making intermediate full stages of their movement towards their final position shown in FIG. 11. FIG. 10 also shows additional guide members 31 and 32, which are not shown in FIG. 1, nor in FIGS. 2-9, for reasons of simplification. Their showing is useful only for the display of FIG. 10.

FIG. 11 shows the tape finally brought into place around the headwheel 30 and displays all of the guide rollers in their operating positions, as well as the capstan drive shaft 28 and the sound recording heads 29 all in contact with the tape. At this stage the tape begins to move, as indicated by the larger number of positions of the four dots on the headwheel 30 shown in FIGS. 2-10, symbolizing the positions of magnetic heads around the headwheel. On the monitor FIG. 11 may be (but does not need to be) a moving display, with the headwheel revolving at a relatively slow rate because it is not until the situation of FIG. 12 that the pressure roller 27 is brought to bear on the tape and, through the tape, on the capstan shaft 28 so that the tape moves at its operating speed.

If during the threading procedure malfunction could occur, for example, by tearing of the magnetic tape or blockage of the threading mechanism, this would be displayed on the monitor 1 to the operator of the videotape equipment and at the same time the last disturbance-free state of the equipment would remain stored in the monitor 1. Control of the threading mechanism is taken by a computer (not shown) which determines with respect to time the course of the threading of the tape with reference to the actual position of the tape 6 and of the rollers of variable position, making use of the synchronizing signals mentioned above that are, at least in part, used to synchronize the monitor graphics.

Representation of the unthreading of the tape proceeds in the opposite direction of the representation of threading as shown on the monitor 1. Both for the threading and for the unthreading operations the same light beams and/or electromechanical probes which are used for the computer control above mentioned are used also as sensors for the task of changing the monitor graphic display of position of the tape from time to time and likewise the position of rollers of variable position. These sensors (not shown) are already in well-known use for control of the tape threading mechanism and as such are in themselves known in the art.

By the presentation in the form of graphics according to the invention of the threading and unthreading mechanism these complex mechanical procedures can now be visually monitored so that in the case of a failure remedial measures can be quickly and correctly applied. A further advantage is that a graphic representation of the state of the transport mechanism of a videotape machine can be obtained by a remote monitoring arrangement for a number of videotape equipments. At such a monitoring position a seated maintenance operator can serve several magnetic tape equipments each getting accessible appropriate attention, all of which is provided from a single maintenance desk.

Although the invention has been described by reference to a particular illustrative example, it will be understood that variations and modifications are possible within the inventive concept.

We claim:

1. A method of monitoring an insertion of a magnetic tape in a magnetic tape video equipment having a movable tape guide mechanism, said method comprising the steps of sensing predetermined stages of insertion of a tape inserted in said equipment to produce electrical signals at said respective stages of insertion and, in response to said signals, producing a visual display simulating the positions of the tape and of the movable tape guide mechanism.

2. A method according to claim 1, wherein said visual display is produced by computer controlled luminescent graphics.

3. A method according to claim 2, wherein the tape which is inserted into the equipment is contained in a cassette (2) having tape holding means (4, 5) for holding the tape in two coils therein and wherein, while the casette is held in a cassette recess of said equipment, the tape is sensed for producing said signals while it is manipulated by said guide mechanism and the contemporaneous cassette position is also graphically displayed in said visual display.

4. A method according to claim 3, wherein the tape is sensed while being pulled out of the cassette and applied around a scanning device (30) equipped with revolving magnetic heads.

5. A method according to claim 4, wherein the visual display that is produced, in addition to showing the magnetic tape, the cassette and the movable guide mechanism, also shows tape coils in the cassette, stationary guide elements for the tape, the scanning device (30) and also tape drive means (27).

6. A method according to claim 1, wherein sensing and signal producing is performed at least in part by means of light beams.

7. A method according to claim 1, wherein sensing and signal producing is performed at least in part by means of mechanically controlled switch contacts.

8. A method according to claim 4, wherein upon appearance of a disturbance a signal designating a failure is inserted in a graphic representation of magnetic tape course and movable tape guide mechanism displayed in said visual display.

* * * * *